(12) United States Patent
Yoshioka et al.

(10) Patent No.: US 8,474,479 B2
(45) Date of Patent: Jul. 2, 2013

(54) MULTIFUNCTION RELIEF VALVE AND AIRPLANE EMERGENCY HYDRAULIC POWER SOURCE UNIT HAVING THE SAME

(75) Inventors: Teruhiko Yoshioka, Gifu (JP); Hideki Niwa, Gifu (JP)

(73) Assignee: Nabtesco Corporation, Tokyo (JP)

( * ) Notice: Subject to any disclaimer, the term of this patent is extended or adjusted under 35 U.S.C. 154(b) by 384 days.

(21) Appl. No.: 12/730,682

(22) Filed: Mar. 24, 2010

(65) Prior Publication Data

US 2010/0243084 A1 Sep. 30, 2010

(30) Foreign Application Priority Data

Mar. 26, 2009 (JP) .................................. 2009-076471

(51) Int. Cl.
F16K 17/20 (2006.01)

(52) U.S. Cl.
USPC ...... 137/471; 137/495; 137/505.14; 137/529; 137/530; 137/625.18; 137/492.5; 251/251

(58) Field of Classification Search
USPC .............. 137/625.17, 625.18, 3, 455–543.23; 251/213, 229–231, 251–263
See application file for complete search history.

(56) References Cited

U.S. PATENT DOCUMENTS

| | | | | |
|---|---|---|---|---|
| 2,589,731 | A | * | 3/1952 | Ratkoviak ...................... 137/102 |
| 3,269,412 | A | * | 8/1966 | Badke ...................... 137/625.17 |
| 3,512,560 | A | * | 5/1970 | Weise ............................ 137/102 |
| 4,461,449 | A | * | 7/1984 | Turner ............................. 251/62 |
| 4,667,570 | A | * | 5/1987 | Jensen et al. ..................... 91/420 |
| 4,860,788 | A | * | 8/1989 | Asaoka .......................... 137/491 |
| 6,289,927 | B1 | * | 9/2001 | Kaneko .......................... 137/529 |
| 6,341,622 | B1 | * | 1/2002 | McHugh ........................ 137/523 |
| 6,581,630 | B1 | * | 6/2003 | Kaneko ...................... 137/492.5 |
| 6,805,148 | B2 | * | 10/2004 | Progin et al. ................... 137/112 |
| 7,458,212 | B2 | * | 12/2008 | Koizumi et al. ................. 60/461 |
| 7,565,915 | B2 | * | 7/2009 | Krug-Kussius ................ 137/491 |
| 2009/0211650 | A1 | * | 8/2009 | Jeon ................................ 137/488 |
| 2010/0236652 | A1 | * | 9/2010 | Hattori ...................... 137/625.42 |

FOREIGN PATENT DOCUMENTS

| | | |
|---|---|---|
| DE | 19654781 A1 | 7/1998 |
| JP | 2001-336651 A | 12/2001 |
| JP | 2002-364610 A | 12/2002 |

OTHER PUBLICATIONS

Japanese Office Action for Application No. 2009-076471, mailed on Jan. 22, 2013 (11 pages).
Esp@cenet Patent Abstract for Japanese Publication No. 2002-364610, publication date Dec. 18, 2002. (1 page).
Esp@cenet Patent Abstract for Japanese Publication No. 2001-336651, publication date Dec. 7, 2001. (2 pages).

* cited by examiner

*Primary Examiner* — Craig Schneider
*Assistant Examiner* — Jessica Cahill
(74) *Attorney, Agent, or Firm* — Osha • Liang LLP

(57) ABSTRACT

A multifunction relief valve includes a relief chamber having an introduction port and a relief port for introducing and relieving pressure fluid; a back pressure chamber formed on one end side of the relief chamber; a piston which is movably provided in the back pressure chamber and divides the back pressure chamber into a first back pressure chamber and a second back pressure chamber; a first spring which is provided in the first back pressure chamber and exerts a biasing force in a direction in which the relief port is closed; a second spring which is provided in the second back pressure chamber and biases the piston in the direction in which the relief port is closed; and a pilot pressure supply port formed in the first back pressure chamber. The pressure fluid introduced into the first back pressure chamber via the pilot pressure supply port changes the relief pressure.

3 Claims, 6 Drawing Sheets

MULTIFUNCTION RELIEF VALVE AND AIRPLANE EMERGENCY HYDRAULIC POWER SOURCE UNIT HAVING THE SAME

CROSS REFERENCE TO RELATED APPLICATION

The present application claims priority from Japanese Patent Application No. 2009-076471, which was filed on Mar. 26, 2009, the disclosure of which is herein incorporated by reference in its entirety.

BACKGROUND OF THE INVENTION

LBHA is a system in which a hydraulic actuator driven by an airframe hydraulic system of an airplane is supplemented by an emergency hydraulic power source unit (Local Pump Unit abbreviated as LPU). Because of this LPU, the function of the hydraulic actuator is maintained even after the airframe hydraulic system loses its function. LBHA is recited in, for example, the specification of German Laid-Open Patent Application No. 19654781 (hereinafter, Patent Document 1). The LBHA recited in Patent Document 1 is arranged so that two relief valves (9, 10) and a control valve (8) are disposed on a return path of pressure fluid. For example, the relief valve (9) is arranged to be a low-pressure relief valve whereas the relief valve (10) is arranged to be a high-pressure relief valve.

The relief valve (9) functions as a low-pressure relief valve when the airframe hydraulic system is in normal operation. In the meanwhile, when the airframe hydraulic system loses its function, the control valve (8) cuts off the relief valve (9) and the hydraulic pump (5) is electrically driven. In so doing, the relief valve (10) prevents the hydraulic fluid in the closed loop from leaking out (shut off function) and prevents the pressure inside the closed loop from rapidly increasing on account of the thermal expansion of the hydraulic fluid (thermal relief function). The shut off function and the thermal relief function are collectively termed as high pressure relief functions.

As such, the LBHA system of the Patent Document 1 is arranged to exert plural functions by two relief valves (9, 10) and a control valve (8).

This LBHA system of Patent Document 1 is disadvantageous in that the LPU and LPHA require a large space inside the airplane because two relief valves (9, 10) and a control valve (8) must be provided.

SUMMARY OF THE INVENTION

The present invention was done to solve the problem above, and an objective of the present invention is to provide a multifunction relief valve which provides plural functions such as a low-pressure relief function and a high pressure relief function by a single valve.

To achieve the objective above, the present invention provides a multifunction relief valve including: a relief chamber having an introduction port and a relief port for introducing and relieving pressure fluid; a back pressure chamber formed on one end side of the relief chamber; a piston which is movably provided in the back pressure chamber and divides the back pressure chamber into a first back pressure chamber and a second back pressure chamber; a first spring which is provided in the first back pressure chamber and exerts a biasing force in a direction in which the relief port is closed; a second spring which is provided in the second back pressure chamber and biases the piston in the direction in which the relief port is closed; and a pilot pressure supply port formed in the first back pressure chamber, wherein, a relief pressure is changed by pressure fluid introduced into the first back pressure chamber via the pilot pressure supply port.

According to this arrangement, as the pressure fluid is introduced into the first back pressure chamber via the pilot pressure supply port, the biasing force of the second spring biasing the piston in the direction in which the relief port is closed is reduced. In this case, the multifunction relief valve of the present invention functions as a low-pressure relief valve. On the other hand, when the pressure fluid is not introduced into the first back pressure chamber, the multifunction relief valve of the present invention functions as a high-pressure relief valve because the sum of the biasing force of the first spring and the biasing force of the second spring serve as resistance (i.e. the shut off function and the high pressure relief function are exerted). As such, the present invention realizes a multifunction relief valve which achieves plural functions such as the low-pressure relief function and the high pressure relief functions by a single valve.

In addition to the above, the present invention is preferably arranged to further include a releasing mechanism which is provided on the other end side of the relief chamber and allows a pressure in the relief chamber to be manually released.

This arrangement allows the multifunction relief valve to further have a manual releasing function.

In addition to the above, the present invention is preferably arranged to further include a relief chamber dividing component which is movably provided at a border between the relief chamber and the first back pressure chamber and is biased by the first spring, wherein the relief chamber dividing component and the piston are provided on a single straight line.

According to this arrangement, the multifunction relief valve is downsized because the relief chamber dividing component and the piston are provided on the same straight line.

In addition to the above, the present invention is preferably arranged so that the relief chamber dividing component includes: a large diameter portion which opens and closes the relief port and with which the first spring is in contact; and a small diameter portion which is concentric with the large diameter portion and around which the first spring is inserted, and wherein, the small diameter portion of the relief chamber dividing component and the piston are provided on a single straight line to be able to contact each other.

According to this arrangement, the multifunction relief valve is further downsized because the first spring is inserted into the relief chamber dividing component.

As a second aspect, the present invention provides an emergency hydraulic power source unit for an airplane, which unit includes the above-described multifunction relief valve.

This arrangement downsizes the emergency hydraulic power source unit (LPU), thereby reducing a space required by the LPU in the airplane.

DESCRIPTION OF THE PREFERRED EMBODIMENTS

The following will describe an embodiment of the present invention with reference to figures.

Figure 1:
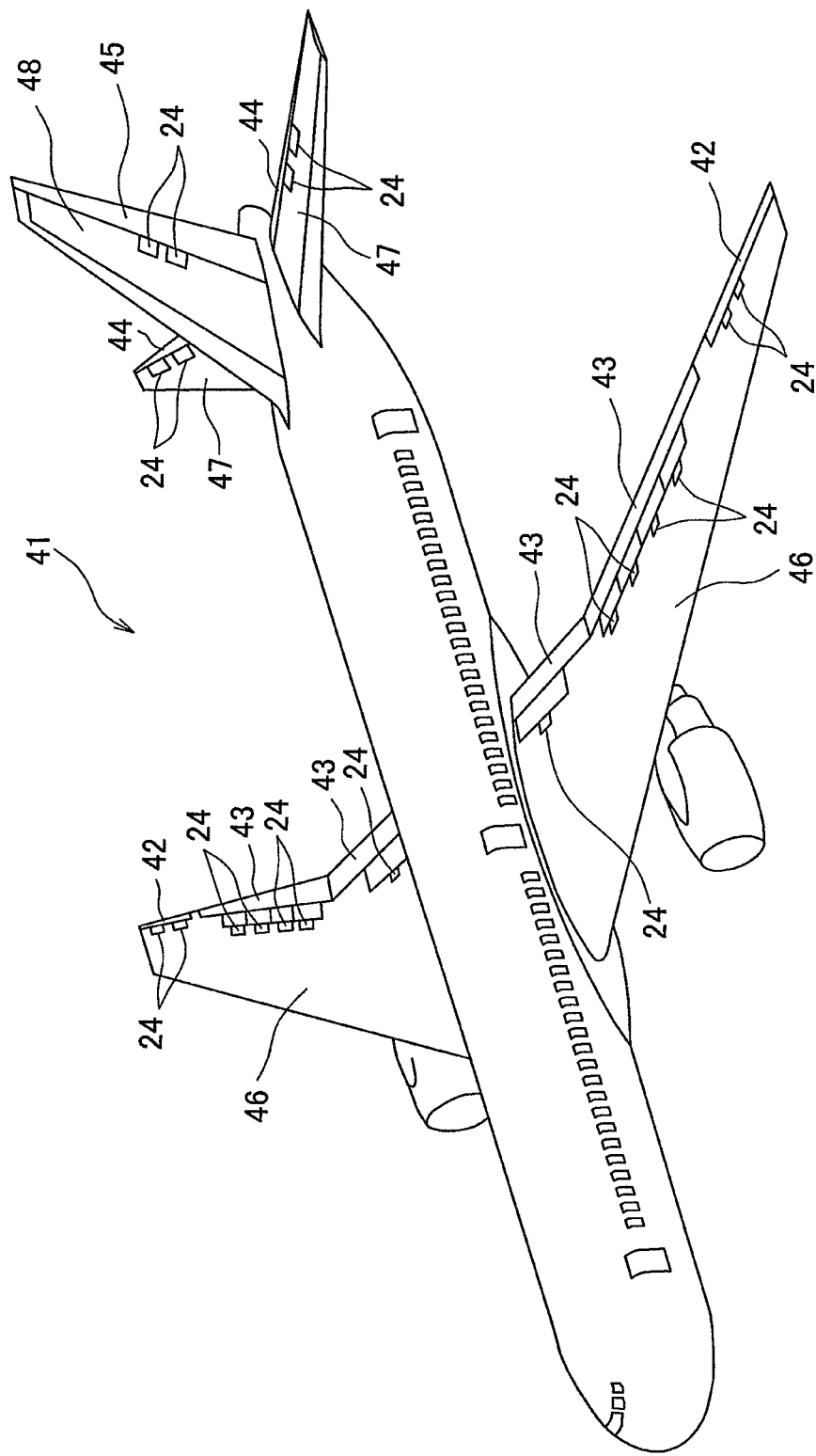
FIG. 1 is a perspective view of an airplane having an emergency hydraulic power source unit (LPU) of an embodiment according to the present invention.
Figure 2:
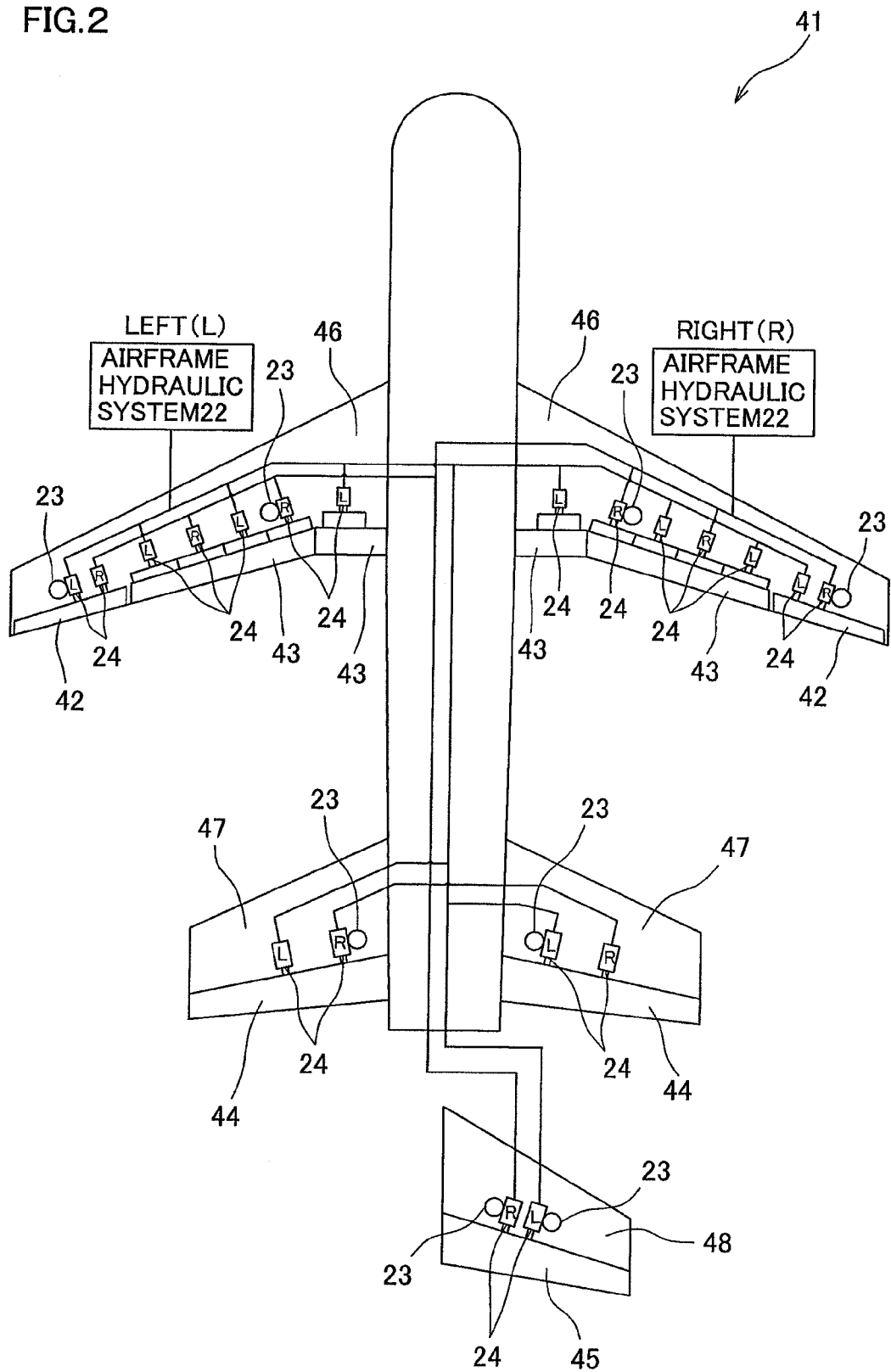
FIG. 2 shows a hydraulic system of the airplane of FIG. 1.

FIG. 1 is a perspective view of an airplane 41 having an emergency hydraulic power source unit (LPU) of an embodiment according to the present invention. FIG. 2 shows a hydraulic system of the airplane 41 of FIG. 1.

As shown in FIG. 1, the airplane 41 has plural movable portions on its wings, in order to change the flight attitude, the direction of flight, and receiving lift forces. For example, the main wings 46 are provided with flaps 43 for generating a high lift force for takeoff and ailerons 42 for rolling the airplane. The horizontal tail planes 47 are provided with elevators 44 for moving up and down the nose. Furthermore, the vertical fin 48 is provided with a rudder 45 for controlling yawing motion of the airplane. These movable portions are movably attached so as to change the inclination angle to the wing or to slide in parallel to the wing, and by such movements the flight attitude and the direction of flight are changed and a high lift force is generated.

Each of these movable portions has a hydraulic actuator 24. This hydraulic actuator 24 is an actuator for changing the inclination angle of a movable portion to the wing or sliding a movable portion in parallel to the wing.

FIG. 2 shows a hydraulic system connected to plural hydraulic actuators 24 of the airplane 41. As shown in FIG. 2, the airplane 41 has two airframe hydraulic systems 22 (right (R) and left (L)). Each of the hydraulic actuators 24 is connected to either the right airframe hydraulic system 22 or the left airframe hydraulic system 22. Each airframe hydraulic system 22 is provided with a hydraulic pump (not illustrated), and operates each hydraulic actuator 24 by supplying pressure fluid thereto.

Each of the flaps 43, the ailerons 42, the elevators 44, and the rudder 45 has at least one emergency hydraulic power source unit 23 (hereinafter, LPU 23). When the airframe hydraulic system 22 is in normal operation, the LPU 23 is stopped and the hydraulic actuator 24 is operated by supplying pressure fluid from the airframe hydraulic system 22 to the hydraulic actuator 24. In the meanwhile, when the airframe hydraulic system 22 loses its function, the hydraulic actuator 24 is operated by driving the LPU 23. This makes it possible to maintain the function of the hydraulic actuator 24 in emergencies.

(LBHA)

Figure 3:
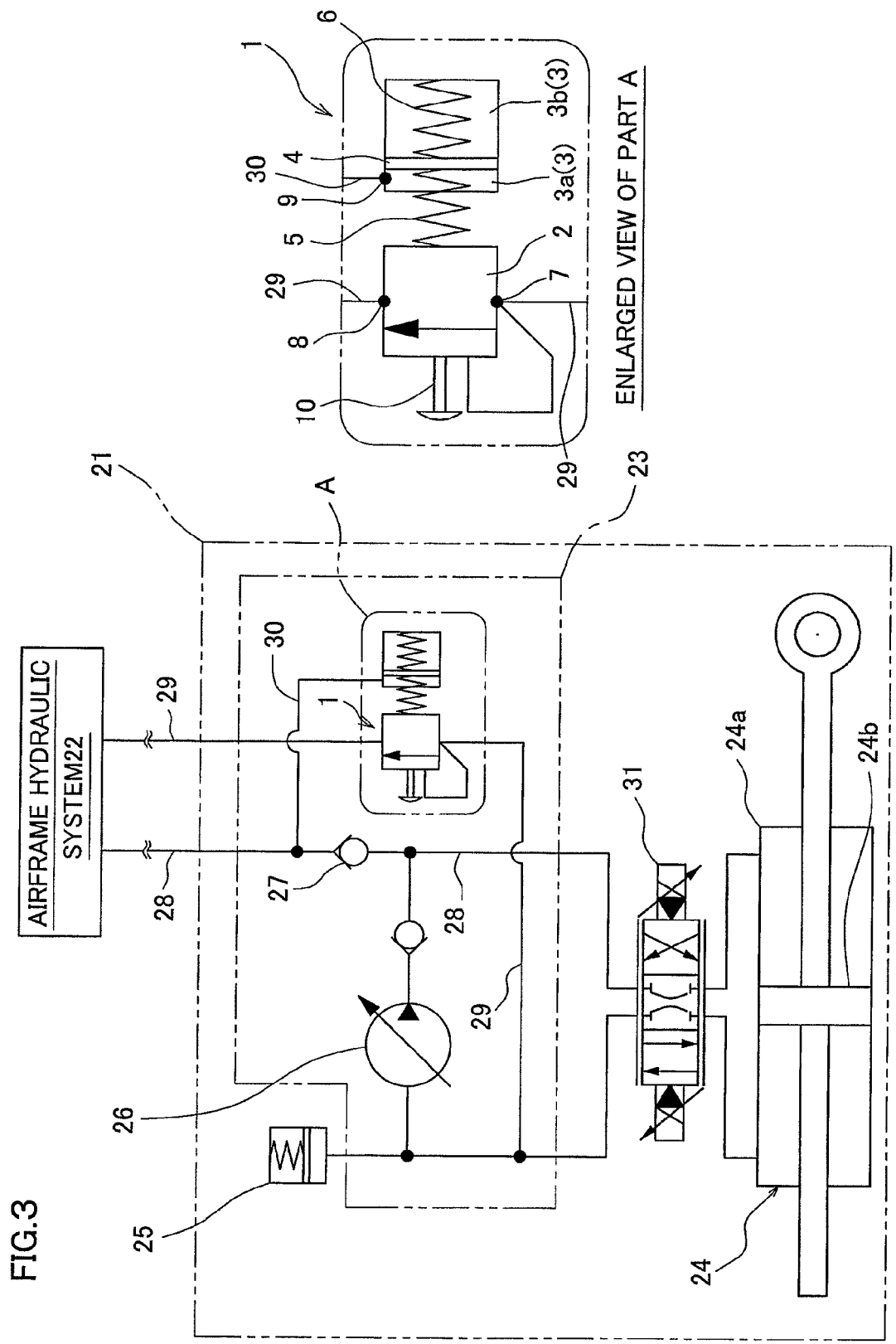
FIG. 3 is a hydraulic circuit diagram of the emergency hydraulic power source unit (LPU) of FIG. 2 and its surroundings.

FIG. 3 is a hydraulic circuit diagram showing the LPU 23 of FIG. 2 and its surroundings. As shown in FIG. 3, a LBHA 21 (Local Backup Hydraulic actuator) is an actuator system including a hydraulic actuator 24, a direction switching valve 31, a LPU 23, and an accumulator 25. The direction switching valve 31 changes the direction of the flow of pressure fluid.

(LPU)

The LPU 23 is provided with an electrically-driven hydraulic pump 26, a multifunction relief valve 1, and a check valve 27. The airframe hydraulic system 22 is connected to a cylinder 24a of the hydraulic actuator 24 by a supply passage 28 and a return path 29 of pressure fluid via the LPU 23. The supply passage 28 is provided with the check valve 27, and the return path 29 is provided with the multifunction relief valve 1. The check valve 27 allows the pressure fluid to flow only in a direction from the airframe hydraulic system 22 to the hydraulic actuator 24. The discharging end of the hydraulic pump 26 is connected to the supply passage 28 on the downstream side of the check valve 27. The path upstream the hydraulic pump 26 is connected to the accumulator 25. The accumulator 25 maintains the suction pressure of the hydraulic pump 26.

(Multifunction Relief Valve)

Figure 4:
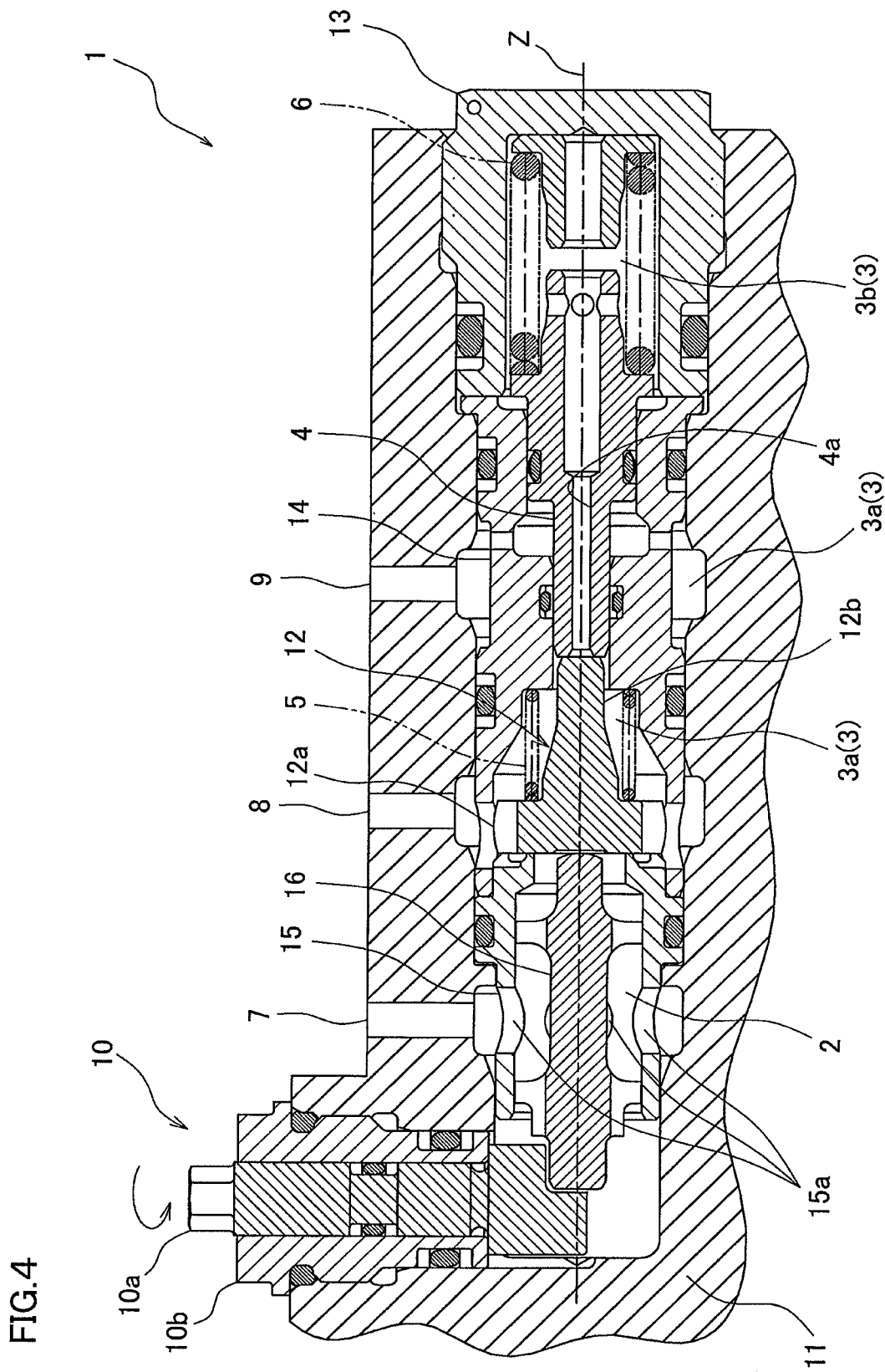
FIG. 4 shows the structure of the multifunction relief valve of FIG. 3.
Figure 5:
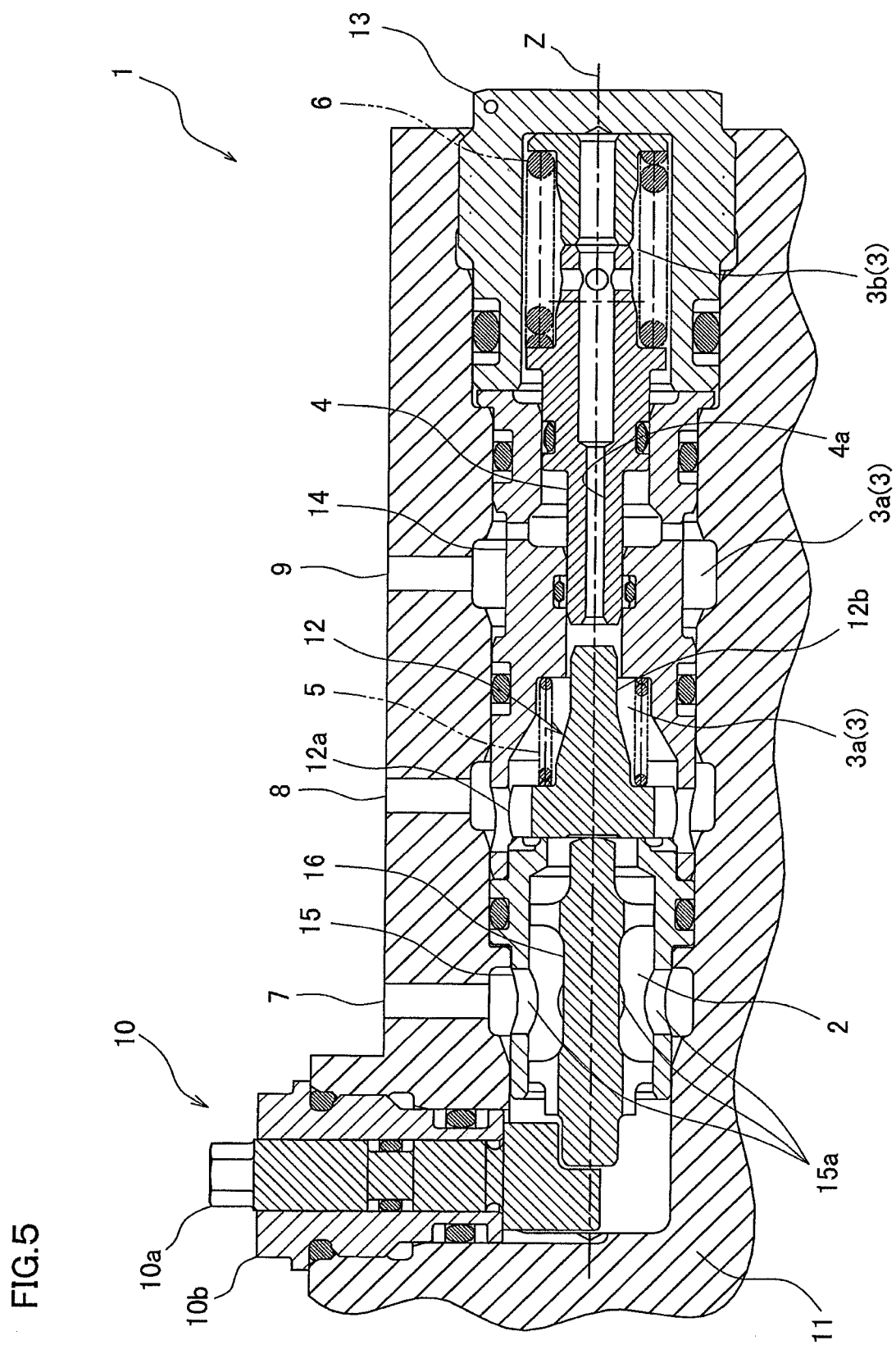
FIG. 5 shows the structure of the multifunction relief valve of FIG. 3.
Figure 6:
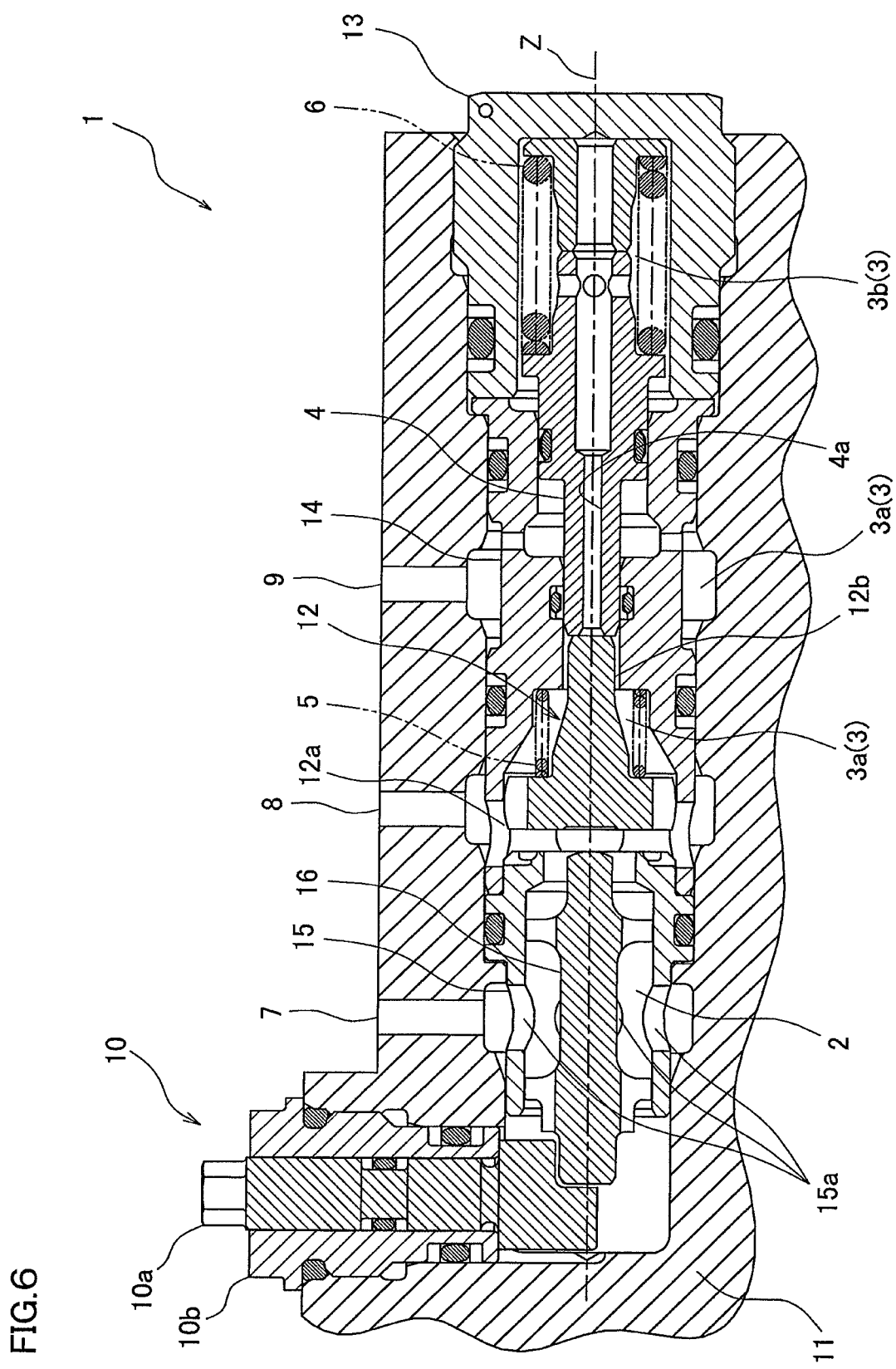
FIG. 6 shows the structure of the multifunction relief valve of FIG. 3.

FIGS. 4-6 show the structure of the multifunction relief valve 1 of FIG. 3. As shown in the circuit diagram of the multifunction relief valve 1 in FIG. 3, the multifunction relief valve 1 has a relief chamber 2, a back pressure chamber 3 formed at one end of the relief chamber 2, and a releasing mechanism 10 formed at the other end of the relief chamber 2. As the structure of the multifunction relief valve 1 shown in FIGS. 4-6 indicates, the relief chamber 2 and the back pressure chamber 3 are formed in a casing 11 and the releasing mechanism 10 is embedded in the casing 11. Although not illustrated in the figures, components such as the hydraulic pump 26, the multifunction relief valve 1, and the check valve 27 are integrated into the LPU 23 as a single unit.

(Relief Chamber)

The relief chamber 2 has an introduction port 7 for introducing the pressure fluid from the return path 29 and a relief port 8 for relieving the pressure fluid. Furthermore, as shown in FIG. 4, a hole penetrating the casing 11 houses therein a tubular member 15, a tubular member 14, and a plug 13 in this order, and these components are fixed to the casing 11. A side wall of the tubular member 15 has plural through holes 15a. The relief chamber 2 is formed either inside the inserted tubular member 15 or inside the casing 11.

(Back Pressure Chamber)

The back pressure chamber 3 houses therein a piston 4 which divides the back pressure chamber 3 into a first back pressure chamber 3a and a second back pressure chamber 3b and is movable in the axial directions Z of the multifunction relief valve 1. As shown in FIG. 4, the first back pressure chamber 3a is formed either inside the inserted tubular member 14 or inside the casing 11, and the second back pressure chamber 3b is formed inside the inserted plug 13. The piston 4 is provided at its center with a through hole 4a extending in the axial directions Z. The first back pressure chamber 3a has a pilot pressure supply port 9 to which a pilot pressure supply passage 30 is connected.

As the border between the relief chamber 2 and the first back pressure chamber 3a, a. poppet 12 (relief chamber dividing component) is provided to be movable in the axial directions Z. The poppet 12 has a large diameter portion 12a by which the relief port 8 is opened and closed and a small diameter portion 12b which is concentric with the large diameter portion 12a. The relief chamber 2 is separated from the first back pressure chamber 3a by the large diameter portion 12a of the poppet 12. The small diameter portion 12b is longer in the axial directions Z than the large diameter portion 12a. The poppet 12 and the piston 4 are disposed so that the small diameter portion 12b of the poppet 12 contacts the piston 4 on a single line extending in the axial directions Z.

The first back pressure chamber 3a houses therein a first spring 5 (coil spring). This first spring 5 is inserted into the small diameter portion 12b of the poppet 12. One end of the first spring 5 contacts the inner surface of the tubular member 14 (i.e. contacts, in the axial directions Z, the surface of the part protruding in the radial direction toward the center), whereas the other end contacts the large diameter portion 12a of the poppet 12. As such, the poppet 12 is biased by the first spring 5 in the direction in which the relief port 8 is closed.

The second back pressure chamber 3b houses therein a second spring 6 (coil spring). This second spring 6 is inserted into the plug 13. One end of the second spring 6 contacts the inner bottom surface of the plug 13, whereas the other end contacts the outer surface of the piston 4 (i.e. contacts, in the axial directions Z, the surface of the part protruding in the radial direction away from the center). As such, the piston 4 is biased by the second spring 6 in the direction in which the relief port 8 is closed.

(Releasing Mechanism)

On the other end side of the relief chamber 2 is provided a releasing mechanism 10. This releasing mechanism 10 is used for manually releasing the pressure inside the relief chamber 2. The releasing mechanism 10 includes a release cam 10a, a plug 10b in which the release cam 10a is inserted, and a plunger 16 with which an end portion of the release cam 10a is in contact.

The plug 10b is inserted into a hole made through the casing 11 so as to be fixed to the casing 11. The plunger 16 is housed in the relief chamber 2 and is movable in the axial directions Z. An end of the plunger is arranged to be capable of contacting the large diameter portion 12a of the poppet 12.

(Operation of Multifunction Relief Valve)

Now, the operation of the multifunction relief valve 1 will be described along with the operation of the LBHA 21, with reference to FIGS. 3-6.

(During Normal Operation of Airframe Hydraulic System)

During the normal operation of the airframe hydraulic system 22 (i.e. when the system 22 normally operates without any problems), the LPU 23 is in the stopped state. As the pressure fluid is supplied from the airframe hydraulic system 22 to the cylinder 24a of the hydraulic actuator 24 via the supply passage 28 and the return path 29, the piston 24b reciprocates (i.e. the hydraulic actuator 24 operates).

In so doing, the first back pressure chamber 3a of the multifunction relief valve 1 receives the pressure fluid from the airframe hydraulic system 22 via the pilot pressure supply port 9, as pilot pressure fluid. In connection with this, FIG. 5 shows a state in which the pilot pressure fluid is introduced into the first back pressure chamber 3a via the pilot pressure supply port 9. As shown in FIG. 5, this pilot pressure fluid pushes the piston 4 so that the second spring 6 contracts, with the result that the piston 4 moves toward the right side of the figure.

Into the relief chamber 2 of the multifunction relief valve 1, the pressure fluid is introduced from the cylinder 24a via the introduction port 7. When the pressure of this pressure fluid is higher than the biasing force of the first spring 5, the poppet 12 moves rightward in the figure (i.e. toward the back pressure chamber) so that the relief port 8 is opened (see FIG. 6). As a result, the pressure fluid from the cylinder 24a is ejected through the relief port 8 and returns to the airframe hydraulic system 22. When the pressure of the pressure fluid is lower than the biasing force of the first spring 5, the relief port 8 is closed and hence the pressure in a part of the return path 29 which part is upstream the relief chamber 2 is secured (maintained). As such, the multifunction relief valve 1 functions as a low-pressure relief valve (low-pressure relief function). It is noted that the pressure at the suction side of the hydraulic pump 26 is secured because the pressure in a part of the return path 29 upstream the relief chamber 2 is secured. The activation of the hydraulic pump 26 is therefore carried out without any difficulties.

(Airframe Hydraulic System Loses its Function)

When the airframe hydraulic system 22 loses its function (i.e. the system 22 does not properly operate due to pipe rupture or other types of malfunctions), the LPU 23 (and the electrically-driven hydraulic pump 26) is driven so that the hydraulic actuator 24 is operated (i.e. the function of the hydraulic actuator 24 is maintained).

First, when the airframe hydraulic system 22 loses its function, the pressure fluid is no longer introduced into the pilot pressure supply port 9 from the pilot pressure supply passage 30. As a result, the piston 4 is moved back to the original position on account of the biasing force of the second spring 6. This state is shown in FIG. 4.

At this stage, the force biasing the poppet 12 toward the relief chamber 2 (i.e. in the direction in which the relief port 8 is closed) is equal to the sum of the biasing force of the first spring 5 and the biasing force of the second spring 6. This increases the relief pressure (i.e. the relief pressure automatically changes toward higher levels). For this reason, the relief port 8 is not opened as long as the pressure in the relief chamber 2 does not exceed the sum of the biasing force of the first spring 5 and the biasing force of the second spring 6. As a result, the multifunction relief valve 1 and the check valve 27 separate the airframe hydraulic system 22 from the LPU 23, i.e. the hydraulic pump 26 of the LPU 23 and the hydraulic actuator 24 form a closed loop, and hence the hydraulic fluid does not flow out (shut off function). When the pressure in the closed loop abnormally increases on account of the thermal expansion of the hydraulic fluid (i.e. when the sum of the biasing force of the first spring 5 and the biasing force of the second spring 6 exceeds the pressure in the relief chamber 2), the pressure opens the relief port 8 and hence the hydraulic fluid is ejected to the outside (thermal relief function). The shut off function and the thermal relief function are collectively termed as high pressure relief functions.

When the airframe hydraulic system 22 returns to normal (i.e. starts to normally operate), as described above, the force biasing the poppet 12 in the direction in which the relief port 8 is closed becomes only the biasing force of the first spring 5, on account of the pilot pressure introduced into the first back pressure chamber 3a via the pilot pressure supply port 9. As a result, the relief pressure is decreased (i.e. the relief pressure automatically changes toward lower levels) and the multifunction relief valve 1 returns to function as a low-pressure relief valve.

As described above, the present invention makes it possible to obtain a multifunction relief valve which achieves plural functions, namely the low-pressure relief function and the high pressure relief function, by a single valve. The multifunction relief valve 1 also has a function to automatically switch between low-pressure relief and high-pressure relief in accordance with the state (normal operation or loss of function) of the airframe hydraulic system 22.

(Operation of Releasing Mechanism)

When the LPU 23 is detached for maintenance or the like, it is necessary to release the residual pressure in the hydraulic circuit of the LBHA 21. In doing so, the release cam 10a of the releasing mechanism 10 is rotated manually and forcefully in the direction shown in FIG. 4. As the end of the release cam 10a rotates, the plunger 16 is pushed by this end toward the poppet 12. As a result, the poppet 12 neighboring the plunger 16 is moved to the back pressure chamber side. The relief port 8 is therefore opened and hence the hydraulic fluid in the relief chamber 2 and the hydraulic fluid in the closed loop are ejected to the outside (manual releasing function). When the releasing mechanism 10 is provided in the multifunction relief valve 1, the multifunction relief valve 1 has the manual releasing function in addition to the aforesaid functions.

(Downsizing of LPU)

The present invention allows a single valve (multifunction relief valve 1) to have plural functions such as the low-pressure relief function and the high pressure relief function. By incorporating such a multifunction relief valve 1 in a LPU 23, an emergency hydraulic power source unit (LPU) is downsized in comparison with conventional technologies in which the aforesaid functions are achieved by plural valves. This reduces a space required by a LPU in an airplane.

The multifunction relief valve 1 of the present embodiment is arranged so that the poppet 12 and the piston 4 are provided on the same straight line. This arrangement results in the downsizing of the multifunction relief valve 1. Furthermore, the arrangement in which the first spring 5 is inserted into the small diameter portion 12b of the poppet 12 also results in the downsizing of the multifunction relief valve 1. These arrangements further ensure the downsizing of the emergency hydraulic power source unit (LPU).

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A multifunction relief valve comprising:
   a relief chamber having an introduction port and a relief port for introducing and relieving pressure fluid;
   a back pressure chamber formed on one end side of the relief chamber;
   a piston which is movably provided in the back pressure chamber and divides the back pressure chamber into a first back pressure chamber and a second back pressure chamber;
   a first spring which is provided in the first back pressure chamber and exerts a biasing force in a direction in which the relief port is closed;
   a second spring which is provided in the second back pressure chamber and biases the piston in the direction in which the relief port is closed;
   a pilot pressure supply port formed in the first back pressure chamber, and
   a relief chamber dividing component which is movably provided at a border between the relief chamber and the first back pressure chamber and is biased by the first spring,
   wherein, the relief chamber dividing component includes:
      a large diameter portion which opens and closes the relief port and with which the first spring is in contact; and
      a small diameter portion which is concentric with the large diameter portion and around which the first spring is inserted,
   wherein, the relief chamber dividing component and the piston are provided on a single straight line and the small diameter portion and the piston are provided on a single straight line to be able to contact each other, and
   wherein, when pressure fluid is introduced into the first back pressure chamber via the pilot pressure supply port, a relief pressure is changed to a low pressure, because the piston is pushed by the pressure fluid and the second spring contracts and hence the piston contacting the small diameter portion is separated from the small diameter portion of the relief chamber dividing component biased by the first spring.

2. The multifunction relief valve according to claim 1, further comprising:
   a releasing mechanism which is provided on the other end side of the relief chamber and allows a pressure in the relief chamber to be manually released.

3. An emergency hydraulic power source unit for an airplane, the unit comprising the multifunction relief valve according to claim 1.

* * * * *